United States Patent
Kaufman et al.

(10) Patent No.: US 11,880,492 B1
(45) Date of Patent: Jan. 23, 2024

(54) SYSTEM FOR GENERATING PRIVACY-PRESERVING VIDEO DATA

(71) Applicant: AMAZON TECHNOLOGIES, INC., Seattle, WA (US)

(72) Inventors: Dotan Kaufman, Netanya (IL); Guy Adam, Tel Aviv (IL); Eran Borenstein, Zichron Yaakov (IL); Ianir Ideses, Raanana (IL); Eduard Oks, Redmond, WA (US); Noam Sorek, Herzliya (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/019,934

(22) Filed: Sep. 14, 2020

(51) Int. Cl.
| | |
|---|---|
| *G06T 7/73* | (2017.01) |
| *G06F 21/62* | (2013.01) |
| *G06T 5/00* | (2006.01) |
| *G09B 19/00* | (2006.01) |
| *G09B 5/06* | (2006.01) |
| *H04N 5/272* | (2006.01) |
| *G06V 20/40* | (2022.01) |

(Continued)

(52) U.S. Cl.
CPC .......... *G06F 21/6263* (2013.01); *G06T 5/005* (2013.01); *G06T 7/73* (2017.01); *G06V 20/40* (2022.01); *G06V 40/161* (2022.01); *G09B 5/065* (2013.01); *G09B 19/003* (2013.01); *H04N 5/272* (2013.01); *H04N 23/90* (2023.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2010/0164862 | A1* | 7/2010 | Sullivan | G06T 7/246 345/156 |
| 2017/0147775 | A1* | 5/2017 | Ohnemus | G16H 15/00 |

(Continued)

OTHER PUBLICATIONS

Goodfellow, et al., "Generative Adversarial Nets", Department of Computer Science and Operations Research, University of Montreal, Jun. 10, 2014, 9 pgs. Retrieved from the Internet: URL: https://papers.nips.cc/paper/5423-generative-adversarial-nets.pdf.

*Primary Examiner* — Eileen M Adams
(74) *Attorney, Agent, or Firm* — Lindauer Law, PLLC (57) ABSTRACT

First video data representing performance of an activity by a first user is acquired. Poses of the first user are determined from the first video data. Second video data is generated based on the determined poses and based on appearance data that represents a second user, such as a model, paid performer, and so forth, in various poses. The resulting second video data depicts the second user performing the same poses as the first user. The second video data may then be sent to a recipient. For example, a participant in an exercise class may send a video to an instructor that depicts what appears to be the paid performer performing the poses, instead of the participant. As a result, video data showing the participant is not shared, protecting the privacy of the participant while still allowing them to participate and interact.

22 Claims, 5 Drawing Sheets

(51) Int. Cl.
*G06V 40/16* (2022.01)
*H04N 23/90* (2023.01)

(56) References Cited

U.S. PATENT DOCUMENTS

2019/0138105 A1* 5/2019 Ragupathy .............. G06F 3/017
2020/0382801 A1* 12/2020 Zheng .................. G06K 9/3233

* cited by examiner

SYSTEM FOR GENERATING PRIVACY-PRESERVING VIDEO DATA

BACKGROUND

Videos may be used to provide instructional content for performance of a variety of activities. In some cases, a video of a user performing an activity may be used to provide feedback to the user. However, transmission of videos that depict a user may invoke privacy concerns.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Videos may be used to provide instruction to users for performance of activities. For example, a video may depict an instructor performing one or more fitness exercises while providing verbal instruction. A user may attempt to perform the exercise by duplicating the movements of the instructor. In cases where a user experiences difficulty performing an activity correctly, receiving feedback from an instructor or other individual may be helpful. For example, a user may perform a fitness exercise within a field of view of a camera to generate video data, and this video data may be stored and sent to another user, such as an instructor, at a subsequent time, or sent in real-time, such as by streaming the video data. However, in some cases, a user may wish to protect their privacy. For example, a video may include a depiction of a user's face, body, or other identifiable information, a visible background or other location where the video data was acquired, depictions of objects or of other individuals, or audio or other types of content that the user wishes to keep private. In such a case, transmission of video data to another individual may compromise the privacy of the user.

Described in this disclosure are techniques for enabling video data representing a first user performing an activity to be sent to a second user while protecting the privacy of the first user. The first user may perform the activity within a field of view of a camera, and first video data representing the first user performing the activity may be acquired. In some cases, the first video data may be acquired while other video data is presented. For example, the first user may perform an activity while instructional content related to the activity, such as a video of an instructor performing the activity, is presented.

Based on the first video data, pose data representing the poses of the first user during performance of the activity may be determined. Each pose may be represented by a set of points, each point representing the location and orientation of a body part of the user, such as positions of the user's knees, feet, hips, head, and so forth. For example, the location of a body part of a user may be represented as a coordinate location with respect to a camera. The locations and orientations of one or more points of a pose may be constrained by the location of one or more other points based on a set of rules. For example, the location of a point representing a user's foot may be constrained based on the location of a point representing the user's knee, and vice versa. As another example, the location of points representing a user's wrist, shoulder, and elbow may be constrained by a rule indicating a maximum or minimum angle at which the elbow may be positioned. The determined pose data may also include segmentation data, shape data, data indicative of a three-dimensional shape or position of a user, and so forth, which may be determined based on the first video data. For example, data indicating portions of a video that depict a user, a background, other objects, and so forth may also be determined.

The pose data may be used to generate additional video data that depicts a second user, such as an actor, instructor, or other human user, performing the same poses as the first user. For example, appearance data that represents the second user in one or more poses may be accessed. Appearance data may include one or more of video data, image data, or pose data that represents the second user in a variety of poses. For example, appearance data may include video data acquired from a camera while the second user performs one or more activities within the field of view of the camera. Authorization may be acquired from the second user prior to use of the appearance data to generate additional video data. Based on the appearance data and the pose data, second video data may be generated that depicts the second user, represented in the appearance data, performing the poses of the first user represented in the first video data. As a result, the second video data may depict the body of the second user performing the activity using the same movements and achieving the same positions as the first user. Depicting a different user performing the motions of the first user may protect the privacy of the first user. To further protect the privacy of the first user, the second video data may also modify, obscure, or replace a background in the first video data, or modify or obscure the face or facial expressions of the first user.

In some implementations, the appearance data and the pose data may be processed using a conditional generative adversarial network (C-GAN) to generate the second video data. For example, a C-GAN may use the appearance data representing the second user, other appearance data representing other users, the video data representing the first user, and other video data that depicts users in various poses as inputs. A C-GAN may be generated by training two models: a generative model that generates the second video data based on the inputs, and a discriminative model that determines a probability that a portion of the second video data is associated with artificially generated data or existing recorded data. The C-GAN uses the generative model to generate the second video data in a manner that maximizes the probability that the discriminative model will determine that the second video data is not artificially generated. For example, the C-GAN may generate the second video data based on conditions to match the poses of the first user represented by the first video data and the appearance of the second user represented by the appearance data.

Implementations described herein may therefore protect the privacy of a first user while enabling the first user to send video data to others. For example, the specific poses performed by the first user and appearance data acquired from a second user may be used to generate video data that depicts the second user performing the poses of the first user. In some implementations, the appearance data representing the second user may be compared to the pose data representing the first user to determine whether sufficient data exists to depict the second user performing the same poses as the first user. For example, a shape of the first user may be compared to a shape of the second user, the poses of the first user may be determined to be within a threshold variance of the poses of the second user, and so forth. In some implementations, the first user may select a particular second user, from among multiple possible users, for use in a video. In other cases, a second user may be selected automatically based on whether the poses of the second user are within a threshold variance of those of the first user. For example, if insufficient data exists to depict the second user in the poses of the first user, the second user may not be available for selection or use in the second video data. However, if the poses of the second user are within a threshold variance of those of the first user, the first user may select the second user for use in a video, or the second user may be used automatically. In some implementations, the second user may be selected in a random or pseudo-random manner.

While implementations described herein may be used to enable a participant in an activity to send video data to an instructor while protecting the privacy of the participant, in other implementations, an instructor may also generate video data to be sent to participants. For example, an instructor may perform an activity, and the poses of the instructor may be used to generate video data that depicts the participant performing the same movements and poses of the instructor. This video data may then be sent to the participant to enable the participant to view their own body performing the poses that were performed by the instructor. In some implementations, a user interface may be presented that displays the participant's body performing these poses alongside a video representing the actual poses performed by the participant. As another example, an instructor may receive video data from a participant, and the poses of the received video data may be used to generate video data that depicts the instructor performing those poses. For example, an instructor may wish to demonstrate an error or a correct pose, as it was performed by a first participant, to other participants, by creating a video that depicts the instructor's own body demonstrating the pose, to avoid compromising the privacy of the first participant.

Figure 1:
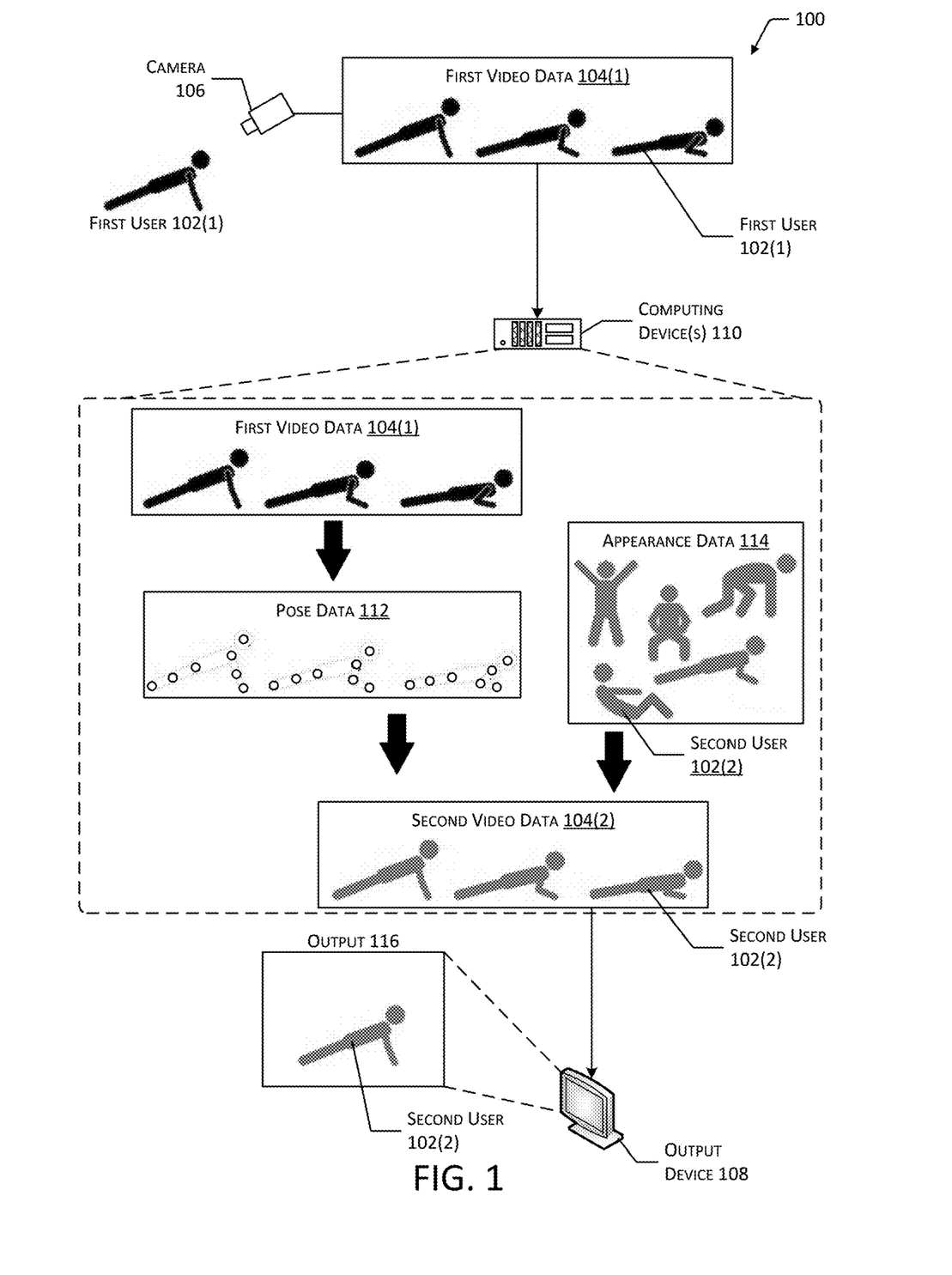
FIG. 1 depicts an implementation of a system that determines the poses of a first user represented in first video data and generates second video data that depicts a second user performing the determined poses.

FIG. 1 depicts an implementation of a system 100 that determines the poses of a first user 102(1) that are represented in first video data 104(1) and generates second video data 104(2) that depicts a second user 102(2) performing the determined poses. A first user 102(1) may perform an activity within a field of view of a camera 106. For example, the activity may include a fitness exercise, an occupational training activity, and so forth. The camera 106 may acquire first video data 104(1) that represents the first user 102(1) performing the activity. In some implementations while the first user 102(1) performs the activity, video data 104 may be output using an output device 108 associated with the first user 102(1). For example, the first user 102(1) may view a video in which an instructor demonstrates performance of the activity while the first user 102(1) attempts to duplicate the movement and position of the instructor.

In some implementations, one or more computing devices 110 may receive the first video data 104(1) from the camera 106. While FIG. 1 depicts the computing device(s) 110 as a server that is separate from the camera 106, any number and any type of computing device(s) 110 may be used including, without limitation, personal computing devices, portable computing devices, wearable computing devices, servers, set top boxes, and so forth. In one implementation, the computing device(s) 110 may include a smartphone. For example, a smartphone may include an integrated camera 106 that acquires the first video data 104(1) and one or more output devices 108, such as touchscreen displays and speakers, that may present video output. In other implementations, multiple computing devices 110 may be used. For example, a personal computing device in an environment with the first user 102(1) may receive the first video data 104(1) from the camera 106 and perform a portion of the functions described herein, while one or more servers may receive data from the personal computing device or from the camera 106 and perform other functions.

The computing device(s) 110 may determine pose data 112 based on the first video data 104(1). Each pose may be represented by a set of points, each point representing the location and orientation of a body part of the first user 102(1). In some implementations one or more object recognition or segmentation algorithms may be used to identify portions of frames of the first video data 104(1) in which the first user 102(1) is visible. For example, a segmentation algorithm may determine portions of a frame of video data 104(1) associated with a foreground, a background, the first user 102(1), one or more other objects, and so forth. An object recognition algorithm may determine portions of a frame of video data 104(1) that correspond to particular body parts of the first user 102(1). Each determined body part may be represented by a point. The locations and orientations of one or more of the points may be constrained by the locations or orientations of one or more other points based on a set of rules. For example, FIG. 1 depicts the first video data 104(1) including three example frames. The body of the first user 102(1) is in a different position in each of the example frames. The pose data 112 is shown indicating a plurality of points for each frame of the first video data 104(1), each point indicating the position of a body part of the first user 102(1).

The computing device(s) 110 may also access appearance data 114 that represents a second user 102(2) in one or more poses. Appearance data 114 may include video data 104, image data, pose data 112, or other types of data that represent poses of the second user 102(2) or from which poses of the second user 102(2) may be determined. For example, appearance data 114 may include video data 104 acquired using a camera 106 while the second user 102(2) performs one or more activities within the field of view of the camera 106. The computing device(s) 110 may acquire authorization from the second user 102(2) prior to storage of the appearance data 114, use of the appearance data 114 to generate video data 104, and so forth. The appearance data 114 may be stored in association with the computing device(s) 110 or in association with another device that is accessible to, or that provides the appearance data 114 to, the computing device(s) 110. The second user 102(2) may be a different individual than the first user 102(1). For example, the second user 102(2) may be an instructor associated with the activity performed by the first user 102(1), an actor, a model, a paid performer, or another type of human user. The poses of the second user 102(2) represented in the appearance data 114 may not necessarily include the same poses as those indicated in the pose data 112 determined from the first video data 104(1). However, a sufficient amount of appearance data 114, or poses that may be determined from the appearance data 114, may exist to enable a video to be generated in which the second user 102(2) performs poses that may not be identically represented in the appearance data 114. In some implementations, the computing device(s) 110 may determine that sufficient information exists to depict the second user 102(2) performing the poses indicated in the pose data 112 prior to generation of second video data 104(2) based on the appearance data 114. For example, the computing device(s) 110 may determine whether the pose(s) represented in the appearance data 114) are within a threshold tolerance of the pose(s) represented by the pose data 112. In some implementations, the computing device(s) may determine whether a shape or form of the second user 102(2), determined based on the appearance data 114, is within a threshold tolerance of a shape or form of the first user 102(1), determined based on the first video data 104(1) prior to generation of the second video data 104(2). For example, if the second user 102(2) is significantly taller or shorter than the first user 102(1), a video that depicts the body of the second user 102(2) performing the poses of the first user 102(1) may be subject to inaccuracy.

The computing device(s) 110 may generate second video data 104(2) based on the pose data 112 and the appearance data 114. The second video data 104(2) may depict the second user 102(2), represented in the appearance data 114, performing the poses of the first user 102(1) indicated in the pose data 112. Therefore, the second video data 104(2) may depict the second user 102(2) performing the same activity as the first user 102(1), by making the same motions and achieving the same poses. Another individual, such as an instructor, viewing the second video data 104(2) may therefore provide instruction or feedback that is relevant to the movement and position of the first user 102(1) without viewing the first video data 104(1). As a result, the privacy of the first user 102(1) may be protected. For example, the face of the first user 102(1), the body of the first user 102(1), a background location, or other objects or individuals within the field of view of the camera 106 may not be included in the second video data 104(2). Continuing the example, FIG. 1 depicts the second video data 104(2) being provided to an output device 108, which may generate output 116 depicting the second user 102(2) performing the activity. Other users 102 who view the output 116 may view the movement and poses that were achieved by the first user 102(1) without viewing the body, face, background, and so forth included in the first video data 104(1).

In some implementations, the second video data 104(2) may be generated using a C-GAN or another type of neural network or machine learning system. For example, a C-GAN may process the appearance data 114 and one or more of the pose data 112 or first video data 104(1) to generate the second video data 104(2). The C-GAN may use the appearance data 114 representing the second user 102(2) and other appearance data 114 that represents users in various poses as inputs to train a generative model and a discriminative model. The generative model may generate the second video data 104(2), which may then be evaluated by the discriminative model. The C-GAN may be optimized to generate the second video data 104(2) in such a way that the discriminative model determines an outcome indicating that the second video data 104(2) includes recorded content rather than artificially generated content.

For example, a C-GAN may function using an adversarial process in which two models may be trained. A generative model captures a data distribution while a discriminative model estimates the probability that a sample came from the training data rather than the generative model. The training procedure for the generative model is to maximize the probability that the discriminative model will erroneously determine the source of a sample. For example, a solution for the generative model that maximizes such a probability may cause the discriminative model to determine a probability of ½ in all cases. One example description of a Generative Adversarial Network may be found in Goodfellow, I. et al., (2014, Jun. 10). "Generative Adversarial Nets", Department d'informatique et de recherche operationelle, Universite de Montreal, Montreal, QC H3C 3J7, retrieved from arXiv:1406.2661v1 [stat.ML], which is incorporated by referenced herein.

Figure 2:
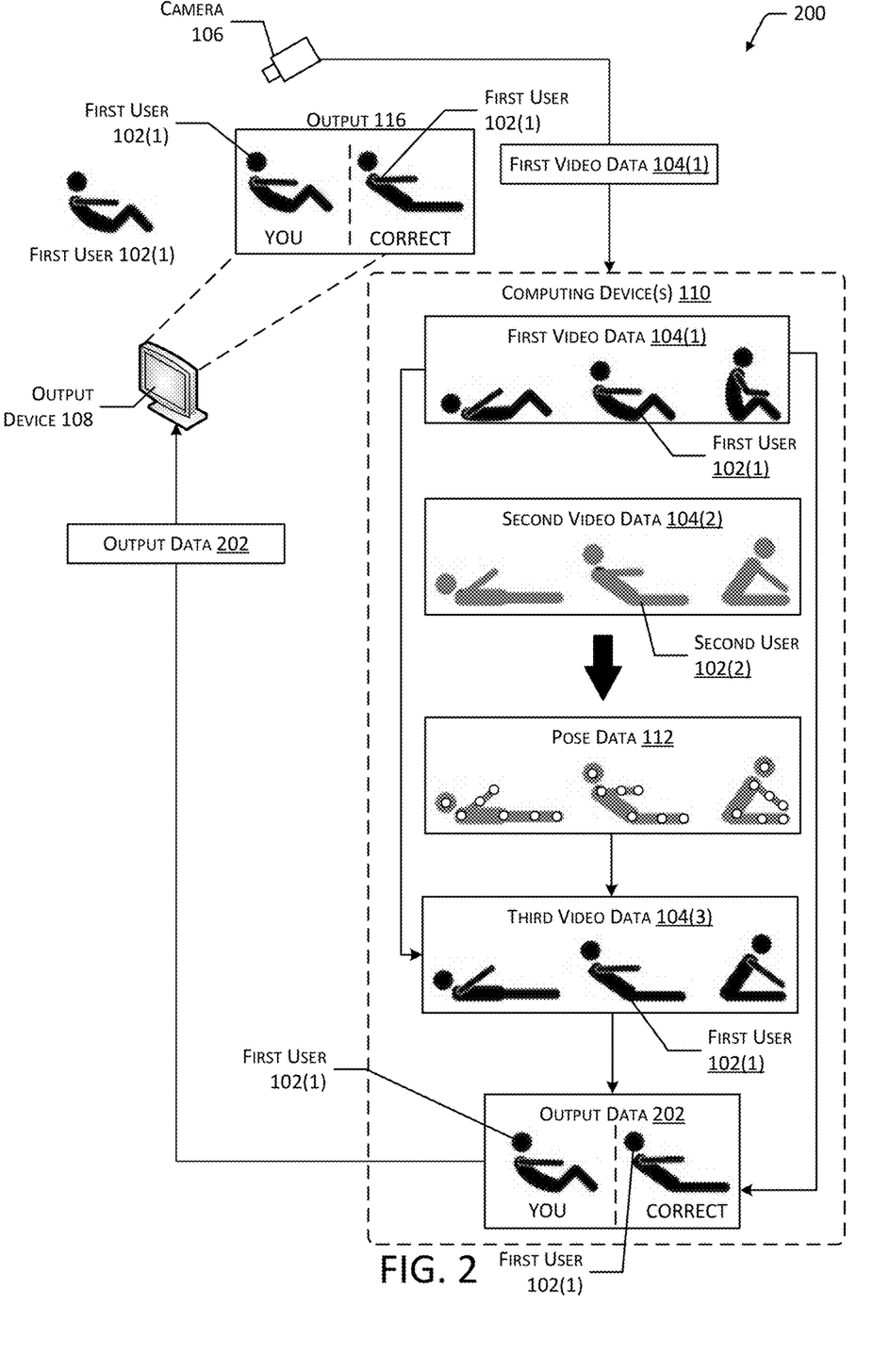
FIG. 2 depicts an implementation of a system for generating a user interface depicting a first user in multiple poses.

FIG. 2 depicts an implementation of a system 200 for generating a user interface depicting a first user 102(1) in multiple poses. The user interface may be generated based on first video data 104(1) representing the first user 102(1) and second video data 104(2) representing a second user 102(2). As described with regard to FIG. 1, a first user 102(1) may perform an activity within a field of view of a camera 106. First video data 104(1) representative of the first user 102(1) may be acquired from the camera 106. In some cases, output 116, such as instructional content, may be presented while the first user 102(1) is performing the activity. In some implementations, as shown in FIG. 2, the output 116 may include a user interface that presents a current pose of the first user 102(1) concurrent with a generated video in which the body of the first user 102(1) is shown performing a correct pose.

One or more computing devices 110 that receive the first video data 104(1) from the camera 106 may generate output data 202 to cause presentation of the output 116. The user interface that is output may be generated based on the first video data 104(1) and second video data 104(2). The computing device(s) 110 may access second video data 104(2) that represents a second user 102(2) performing the activity. For example, the second video data 104(2) may depict an instructor, actor, model, paid performer, or another individual performing the same activity as the first user 102(1). The poses achieved by the second user 102(2) while performing the activity may represent correct performance of the activity.

The computing device(s) 110 may determine pose data 112 based on the second video data 104(2). As described with regard to FIG. 1, each pose may be represented by a set of points, each point representing the location and orientation of a body part of the second user 102(2). Object recognition algorithms may be used to determine portions of frames of the second video data 104(2) in which the second user 102(2) is visible and portions of frames that correspond to particular body parts of the second user 102(2). The first video data 104(1) and the pose data 112 may be used to generate third video data 104(3) that depicts the first user 102(1) performing the poses of the second user 102(2) that are represented by the pose data 112. For example, output 116 based on the third video data 104(3) may depict the first user's 102(1) own body performing the correct poses represented in the second video data 104(2), which may facilitate understanding of the activity by the first user 102(1). Generation of the third video data 104(3) may also protect the privacy of the second user 102(2) depicted in the second video data 104(2) by enabling the first user 102(1) to view the poses performed in the second video data 104(2) without viewing the second user 102(2). Generation of the user interface may include synchronizing portions of the user interface based on the first video data 104(1) with those portions based on the third video data 104(3). For example, a portion of the first video data 104(1) that is associated with a first pose and a portion of the third video data 104(3) that is associated with a corresponding pose may be determined, such as by determining poses that are within a threshold level of similarity. Output 116 based on the corresponding portions of the first video data 104(1) and third video data 104(3) may then be presented at a similar rate such that the first user 102(1) shown in the third video data 104(3) moves at a similar rate and achieves corresponding poses alongside the first user 102(1) shown in the first video data 104(1).

As described with regard to FIG. 1, in some implementations, the third video data 104(3) may be generated using a C-GAN or another type of neural network or machine learning algorithm. For example, a generative model of the C-GAN may process the first video data 104(1), second video data 104(2), and pose data 112 to generate the third video data 104(3). The C-GAN may be trained using video data 104 or other appearance data 114 that depicts users 102 in various poses as inputs. A discriminative model of the C-GAN may then process the third video data 104(3) and generate an outcome indicating whether the third video data 104(3) includes recorded content or artificially generated content.

The first video data 104(1) and third video data 104(3) may be used to generate the output data 202. The output data 202 may be provided to an output device 108 to cause an output 116 to be presented. As shown in FIG. 2, the output 116 may include a user interface in which a pose of the first user 102(1), determined based on the first video data 104(1), is shown simultaneously with a corresponding pose of the third video data 104(3). Therefore, the user interface may present the body of the first user 102(1) performing a correct pose represented in the third video data 102(3) alongside a current pose of the first user 102(1) represented in the first video data 102(1). Presentation of the first user's 102(1) own body performing a correct pose, adjacent to a current position of the first user's 102(1) body may facilitate correct performance of the activity by the first user 102(1). In other implementations, representations of a correct pose and a current pose of the first user's 102(1) body may be superimposed on one another to facilitate identification of body parts of the first user 102(1) that deviate from a correct pose.

Figure 3:
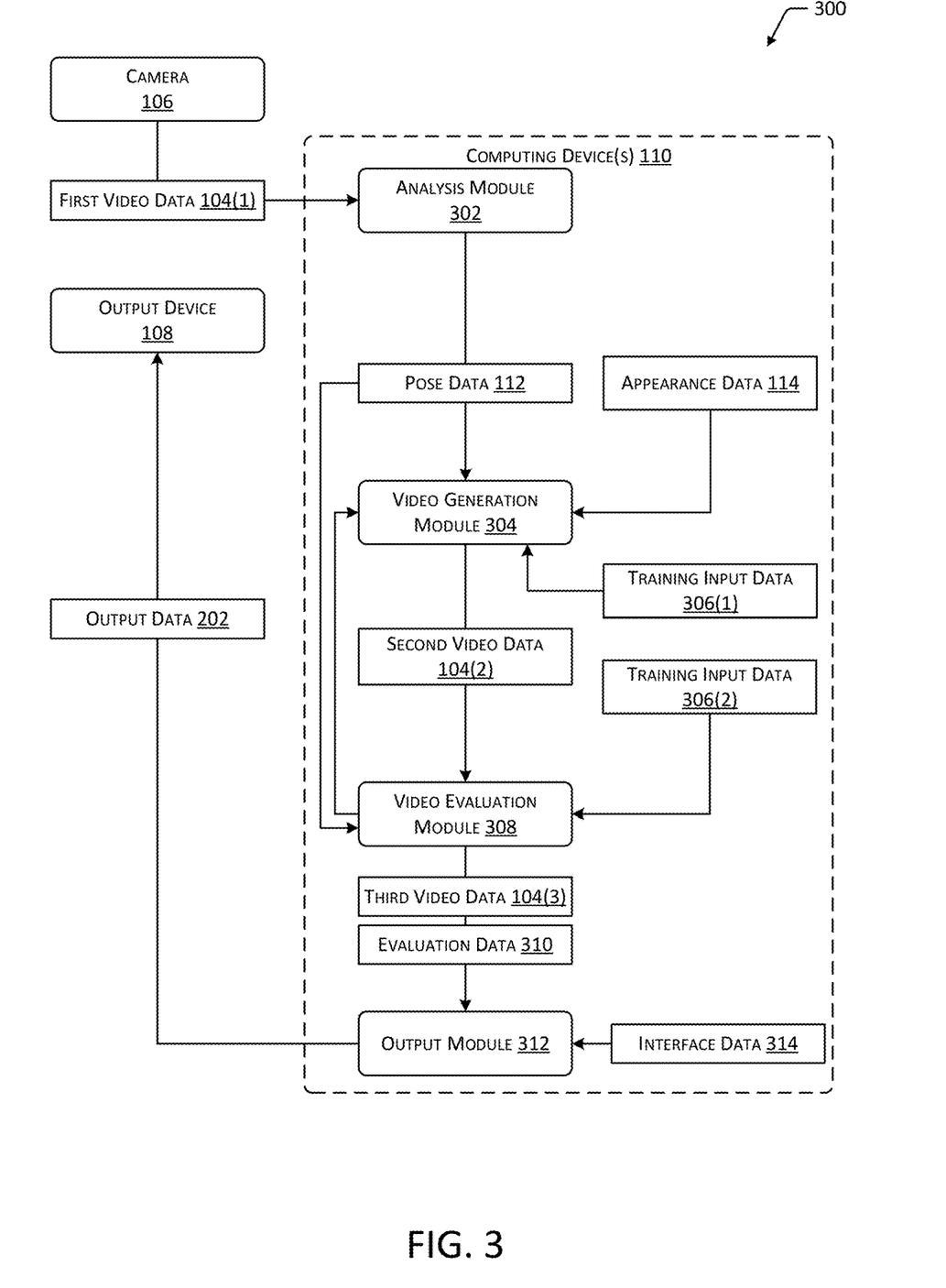
FIG. 3 is a block diagram illustrating an implementation of a system for generating an output based on video data received from a camera.

FIG. 3 is a block diagram 300 illustrating an implementation of a system for generating an output 116 based on video data 104(1) received from a camera 106. As described with regard to FIGS. 1 and 2, a camera 106 may generate first video data 104(1) depicting a user 102(1) performing an activity within a field of view of the camera 106. One or more computing devices 110 may receive the first video data 104(1) from the camera 106.

An analysis module 302 associated with the computing device(s) 110 may determine pose data 112 representative of the poses of the user 106(1) in at least a subset of the frames of the first video data 104(1). In some implementations, the analysis module 302 may include one or more object recognition or segmentation algorithms to identify portions of frames of video data 104(1) in which the user 106(1) is visible. An object recognition algorithm may determine portions of a frame of video data 104(1) that correspond to particular body parts of the user 106(1). As described previously, the determined positions of parts of the user's body may be represented as a set of points. The locations and orientations of one or more points may be constrained by the location of one or more other points based on a set of rules. In some implementations, each point of a pose may associate an identifier of the point with a particular location or orientation of the point. In some implementations, data regarding a point may also indicate movement of the point, a confidence value associated with the location of the point, and so forth. In some implementations, the pose data 112 may also include segmentation information, shape information, information regarding a three-dimensional position of a user 102 or other object (such as information determined using a depth (e.g., RGB-D) camera, and so forth that may indicate portions of video data 104 that include a user 102, a background, one or more other objects, and so forth.

A video generation module 304 associated with the computing device(s) 110 may access the pose data 112 and appearance data 114. As described with regard to FIGS. 1 and 2, appearance data 114 may include video data 104, image data, pose data 112, or other types of data from which poses 112 of represented users 102(2) may be determined. For example, appearance data 114 may include video data 104 acquired from one or more cameras 106 while other users 102(2) perform activities within the field of view of the cameras 106. Authorization may be acquired from the user(s) 102(2) before the appearance data 114 is used to generate videos. The appearance data 114 may include or may be used to determine poses of one or more different users 102(2), other than the user 102(1) depicted in the first video data 104(1). The user(s) 102(2) associated with the appearance data 114 may be depicted in one or more poses that may be similar to or differ from the poses indicated in the pose data 112. For example, the appearance data 114 may be associated with a catalog or list of users 102(2) that may be selected for use by a first user 102(1), or automatically or randomly assigned for use based on characteristics of the first video data 104(1). In some implementations, the video generation module 304 may include one or more C-GANs or other types of neural networks. For example, the video generation module 304 may be previously trained using training input data 306(1), which may include one or more sets of video data 104, or other appearance data 114. Based on the appearance data 114 and the pose data 112, the video generation module 304 may generate second video data 104(2) in which a user 102(2) associated with the appearance data 114 is shown performing the poses of the first user 102(1) represented by the pose data 112. In some implementations, the second video data 104(2) may exclude a face or a background from the first video data 104(1) or may include an alternate face or background. For example, a user 102(1) associated with the first video data 104(1) may select particular features for inclusion or exclusion within the second video data 104(2) based on the privacy considerations of the user 102(1). Continuing the example, the user 102(1) may select whether to include or exclude a body of the user 102(1), a face of the user 102(1), fine motor movements of various body parts of the user 102(1), such as the hands, eyes, head, or face of the user 102(1), a background, or one or more other objects or individuals shown in the first video data 104(1).

A video evaluation module 308 associated with the computing device(s) 110 may process the second video data 104(2), and the pose data 112 determined from the first video data 104(1), and generate evaluation data 310 indicative of whether the second video data 104(2) appears to include recorded content or artificially generated content. For example, the video evaluation module 308 may include a discriminative model associated with a C-GAN that has been trained using training input data 306(2). In other implementations, the video evaluation module 308 may be trained using the same training input data 306(1) as the video generation module 304. In some implementations, based on the evaluation data 310, one or more of the video generation module 304 or video evaluation module 308 may generate third video data 104(3) or modify the second video data 104(2) to form the third video data 104(3). For example, if a texture, background, pose, or other feature of the second video data 104(2) is determined to have the appearance of artificially generated content, third video data 104(3) may be generated based on evaluation data 310 indicative of the artificial appearance. In cases where the video evaluation module 308 determines that the entirety of the second video data 104(2) includes recorded content rather than the appearance of artificially generated content, generation of third video data 104(3) may be omitted and output 116 may be generated based on the second video data 104(2).

An output module 312 associated with the computing device(s) 110 may generate output data 202 based on the third video data 104(3). In some implementations, the output module 312 may access interface data 314 which may be used to generate a user interface based on the third video data 104(3), one or more other features for inclusion in the output data 202, or a layout or arrangement of features for inclusion in the output data 202. For example, the output data 202 may be provided to an output device 108 for generation of an output 116 such as the user interface shown in FIG. 2. In other implementations, the output 116 may include portions of the third video data 104(3) itself, without other elements.

Figure 4:
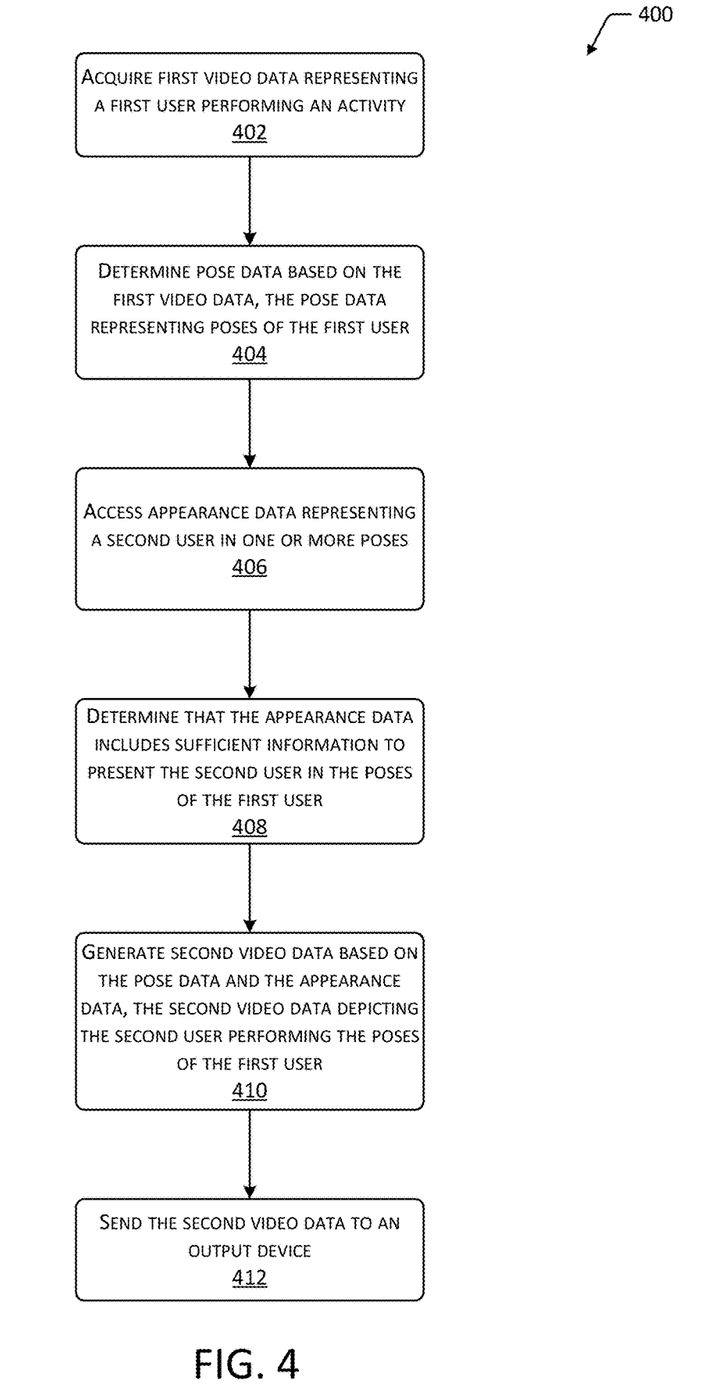
FIG. 4 is a flow diagram illustrating an implementation of a method for generating second video data that depicts a second user performing poses determined from first video data that depicts a first user.

FIG. 4 is a flow diagram 400 illustrating an implementation of a method for generating second video data 104(2) that depicts a second user 102(2) performing poses determined from first video data 104(1) that depicts a first user 102(1). At 402, first video data 104(1) representing a first user 102(1) performing an activity may be acquired. The first video data 104(1) may include a sequence of still images or frames of a video. For example, the first user 102(1) may perform the activity within a field of view of one or more cameras 106. The camera(s) 106 may include RGB camera(s), depth (e.g., RGB-D) camera(s), and so forth. In other implementations, the positions of one or more body parts of the first user 102(1) may be determined using other types of sensors, such as wearable sensors, motion sensors, proximity sensors, RFID sensors, infrared sensors, and so forth. For example, pose data 112 indicative of the position of one or more body parts of the first user 102(1) may be determined based on data from one or more sensors in addition to or in place of acquisition of the first video data 104(1).

At 404, pose data 112 may be determined based on the first video data 104(1), the pose data 112 representing poses of the first user 102(1). Each pose may be represented by a set of points, each point representing the location and orientation of a body part of the first user 102(1). In some implementations, the pose data 112 may be generated using one or more object recognition or segmentation algorithms that may be used to identify portions of frames of the first video data 104(1) in which the first user 102(1) is visible and determine portions of the first video data 104(1) that correspond to particular body parts of the first user 102(1). As discussed previously with regard to FIGS. 1-3, in some cases, the pose data 112 may also include segmentation information, shape information, and so forth. As described with regard to block 402, in other implementations, the pose data 112 may be determined based on sensor data indicative of the location and orientation of one or more body parts of the first user 102(1), in addition to or in place of use of the first video data 104(1). For example, the location or movement of one or more wearable or held sensor devices may be used to determine the location of one or more body parts of the first user 102(1), which may be used to determine the pose data 112.

At 406, appearance data 114 indicative of one or more poses of a second user 102(2) may be accessed. In some implementations, the appearance data 114 may include video data 104, which may be acquired when the second user 102(2) performs one or more activities within a field of view of a camera 106. In other implementations, the appearance data 114 may include image data, pose data 112, or other data that may indicate poses of a second user 102(2) or from which poses of the second user 102(2) may be determined. The appearance data 114 may indicate poses of the second user 102(2) that are similar to or different from the poses of the first user 102(1) indicated in the pose data 112. In other implementations, the appearance data 114 may include data obtained from sensors that indicate the positions of one or more body parts of the second user 102(2). Authorization may be acquired from the second user 102(2) prior to one or more of acquiring the appearance data 114, storing the appearance data 114, or using the appearance data 114 to generate video data 104.

At 408, a determination may be made that the appearance data 114 includes sufficient information to present the second user 102(2) in the poses of the first user 102(1). In some implementations, this determination may include determining that the shape of the first user 102(1) is within a threshold variance of a shape of the second user 102(2). For example, if the shape of the second user 102(2) differs significantly from the shape of the first user 102(1) in one or more dimensions, video data 104(2) that presents the second user 102(2) in poses performed by the first user 102(1) may be subject to inaccuracy or may not be as useful for providing relevant feedback or instruction to the first user 102(1). In other implementations, the poses of the second user 102(2) represented in the second video data 102(2) may be determined to be within a threshold variance of the poses indicated in the pose data 112. For example, the poses represented in the second video data 102(2) may be analyzed to determine that at least a threshold quantity of poses or a threshold quantity of locations of particular body parts exists to present the second user 102(2) in at least a threshold portion of possible poses. In some cases, the first user 102(1) may select the second user 102(2) from a list or catalog of possible users 102 for which sufficient information exists to present the user(s) 102 in the poses of the first user 102(1).

In other cases, a particular second user 102(2) may be automatically or randomly selected.

At 410, second video data 104(2) may be generated based on the pose data 112 and the appearance data 114. The second video data 104(2) may depict the second user 102(2) performing the poses of the first user 102(1). As a result, the privacy of the first user 102(1) may be protected by preventing viewers who see the second video data 104(2) from seeing the first user 102(1) or other features of the first video data 104(1). For example, the first user 102(1) may provide user input selecting whether the body of the first user 102(1), the face of the first user 102(1), fine motor movements of the face or other body parts of the user 102(1) a background, or other objects or individuals in the first video data 104(1) are to be included in or excluded from the second video data 104(2). In other cases, the second video data 104(2) that depicts the second user 102(2) performing the poses of the first user 102(1) may be used to facilitate understanding of an activity by the second user 102(2). For example, the first user 102(1) may be an instructor who may perform an activity correctly within a field of view of a camera 106. The second video data 104(2) may then depict the correct poses of the first user 102(1) being performed by the second user 102(2) to facilitate the understanding of the second user 102(2). In some implementations, the second video data 104(2) may be presented as part of a user interface that depicts a current pose of the second user 102(2) simultaneously with a corresponding pose of the second video data 104(2).

At 412, the second video data 104(2) may be sent to an output device 108. In some implementations, output data 202 used to generate an output 116 may include the second video data 104(2) itself. In other cases, as described with regard to FIG. 3, the output data 202 may include other components determined based on interface data 314. In some implementations, the output data 202 may include data determined based on user input. For example, a user 102(1) may select features to be included in or excluded from a user interface or other type of output 116.

In some implementations, additional video data 104 may be generated based on the second video data 104(2). The additional video data 104 may present a different user 102 performing the poses indicated in the pose data 112. For example, a camera 106 may acquire first video data 104(1) of a participant in an activity. Based on appearance data 114 associated with poses of a second user 102(2), second video data 104(2) may be generated that depicts the second user 102(2) performing the poses of the participant. The second video data 104(2) may be sent to an instructor or other individual associated with the activity to solicit feedback, instruction, and so forth. The instructor may wish to use the second video data 104(2) to communicate information to other participants. For example, the poses of the participant shown in the second video data 104(2) may be useful to demonstrate an error or a correct pose to other participants. In such a case, the instructor may cause additional video data 104 to be generated that shows the body of the instructor, or another selected user 102, performing the poses of the second video data 104(2). For example, an instructor may generate video data 104 that depicts the instructor's body performing the poses of a participant in the activity as a demonstration to other participants.

Figure 5:
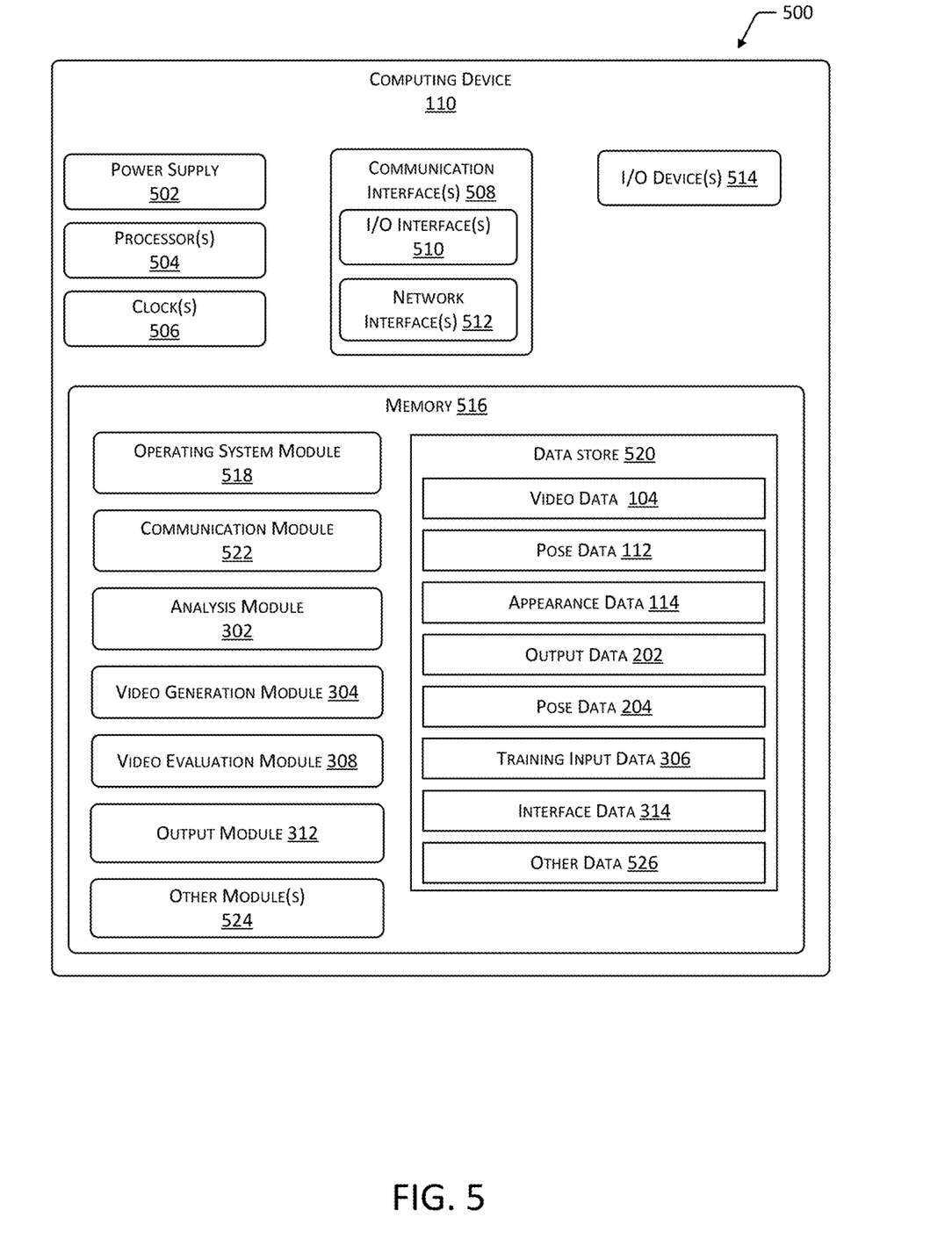
FIG. 5 is a block diagram illustrating an implementation of a computing device within the present disclosure.

FIG. 5 is a block diagram 500 illustrating an implementation of a computing device 110 within the present disclosure. The computing device 110 may include a server, a computing device 110 having an integrated camera 106, such as a smartphone, or any other personal computing device, mobile computing device, portable computing device, and so forth. Additionally, while FIG. 5 depicts a single block diagram 500 of a computing device 110, any number and any type of computing devices 110 may be used to perform the functions described herein.

One or more power supplies 502 may be configured to provide electrical power suitable for operating the components of the computing device 110. In some implementations, the power supply 502 may include a rechargeable battery, fuel cell, photovoltaic cell, power conditioning circuitry, and so forth.

The computing device 110 may include one or more hardware processor(s) 504 (processors) configured to execute one or more stored instructions. The processor(s) 504 may include one or more cores. One or more clock(s) 506 may provide information indicative of date, time, ticks, and so forth. For example, the processor(s) 504 may use data from the clock 506 to generate a timestamp, trigger a preprogrammed action, and so forth.

The computing device 110 may include one or more communication interfaces 508, such as input/output (I/O) interfaces 510, network interfaces 512, and so forth. The communication interfaces 508 may enable the computing device 110, or components of the computing device 110, to communicate with other computing devices 110 or components of the other computing devices 110. The I/O interfaces 510 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include any manner of input devices or output devices associated with the computing device 110. For example, I/O devices 514 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 514 may be physically incorporated with the computing device 110. In other implementations, I/O devices 514 may be externally placed.

The network interfaces 512 may be configured to provide communications between the computing device 110 and other devices, such as the I/O devices 514, routers, access points, and so forth. The network interfaces 512 may include devices configured to couple to one or more networks including local area networks (LANs), wireless LANs (WLANs), wide area networks (WANs), wireless WANs, and so forth. For example, the network interfaces 512 may include devices compatible with Ethernet, Wi-Fi, Bluetooth, ZigBee, Z-Wave, 3G, 4G, 5G, LTE, and so forth.

The computing device 110 may include one or more busses or other internal communications hardware or software that allows for the transfer of data between the various modules and components of the computing device 110.

As shown in FIG. 5, the computing device 110 may include one or more memories 516. The memory 516 may include one or more computer-readable storage media (CRSM). The CRSM may be any one or more of an electronic storage medium, a magnetic storage medium, an optical storage medium, a quantum storage medium, a mechanical computer storage medium, and so forth. The memory 516 may provide storage of computer-readable instructions, data structures, program modules, and other data for the operation of the computing device 110. A few example modules are shown stored in the memory 516, although the same functionality may alternatively be implemented in hardware, firmware, or as a system on a chip (SoC).

The memory 516 may include one or more operating system (OS) modules 518. The OS module 518 may be configured to manage hardware resource devices such as the I/O interfaces 510, the network interfaces 512, the I/O devices 514, and to provide various services to applications or modules executing on the processors 504. The OS module 518 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 520 and one or more of the following modules may also be associated with the memory 516. The modules may be executed as foreground applications, background tasks, daemons, and so forth. The data store(s) 520 may use a flat file, database, linked list, tree, executable code, script, or other data structure to store information. In some implementations, the data store(s) 520 or a portion of the data store(s) 520 may be distributed across one or more other devices including other computing devices 110, network attached storage devices, and so forth.

A communication module 522 may be configured to establish communications with one or more other computing devices 110. Communications may be authenticated, encrypted, and so forth.

The memory 516 may also store the analysis module 302. The analysis module 302 may determine pose data 112 representative of the poses of a user 102 based on one or more frames of video data 104. The analysis module 302 may include one or more object recognition or segmentation algorithms to identify portions of frames of video data 104 that include a user 102. For example, a segmentation algorithm may determine portions of a frame of video data 104 associated with a foreground, a background, a user 102, one or more other objects or individuals, and so forth. An object recognition algorithm may determine portions of a frame of video data 104 that correspond to particular body parts of a user 102. The determined positions of parts of the user's body may be represented as a set of points. The analysis module 302 may access one or more rules or other data indicative of constraints regarding the locations and orientations of one or more points relative to one or more other points. Each point may be represented by an identifier, data indicative of the location of the point within a frame of video data 104, and data indicative of a location and orientation of a body part represented by the point.

The memory 516 may additionally store the video generation module 304. The video generation module 304 may generate new video data 104 based on pose data 112 and appearance data 114. In some cases, appearance data 114 may include acquired video data 104 that depicts one or more users 102 in various poses. For example, first video data 104(1) that depicts a first user 102(1) performing an activity may be used to determine pose data 112 indicative of the poses of the first user 102(1). The determined pose data 112 and appearance data 114 indicative of one or more poses of a second user 102(2) may be used to generate second video data 104(2). The second video data 104(2) may depict the second user 102(2) performing the poses of the first user 102(1) indicated in the pose data 112, such that the second video data 104(2) shows the second user 102(2) performing an activity that is performed by the first user 102(1) in the first video data 104(1). In some implementations, the video generation module 304 may include one or more C-GANs or other types of neural networks. For example, the video generation module 304 may use training input data 306, which may include one or more sets of video data 104, as inputs to train a C-GAN.

The memory 516 may also store the video evaluation module 308. The video evaluation module 308 may process video data 104 generated by the video generation module 304 and determine an outcome indicative of whether the generated video data 104 includes recorded content or appears to include artificially generated content. For example, the video evaluation module 308 may include a discriminative model associated with a C-GAN. In some implementations, the discriminative model may be trained using training input data 306, which may include one or more sets of video data 104 or other types of appearance data 114. For example, the video generation module 304 may include a generative model of a C-GAN that is optimized to generate video data 104 in a manner that maximizes the probably of a discriminative model of the C-GAN determining that the video data 104 includes recorded content rather than artificially generated content.

The memory 516 may store the output module 312. The output module 312 may generate output data 202 based on video data 104 generated by the video generation module 304, and in some cases, based on interface data 314. In some implementations, the output data 202 may be used to generate a user interface based on two sets of video data 104 that show a single user 102 in different poses. In other implementations, the interface data 314 may indicate one or more other features for inclusion in an output 116, a layout or arrangement of features, and so forth. In some implementations, the output data 202 may include portions of the second video data 104(2).

Other modules 524 may also be present in the memory 516. For example, other modules 524 may include permission or authorization modules to enable a user 102 to provide authorization to acquire video data 104 of the user 102. For users 102 that do not opt-in or otherwise authorize acquisition of video data 104 that depicts the user 102, generation, transmission, or use of such video data 104 may be prevented. For example, appearance data 114 may include acquired video data 104 of a user 102, which may not be used to generate additional video data 104 until authorization is obtained from the user 102. Other modules 524 may also include encryption modules to encrypt and decrypt communications between computing devices 110, authentication modules to authenticate communications sent or received by computing devices 110, a permission module to assign, determine, and manage user permissions to access or modify data associated with computing devices 110, user interface modules to generate interfaces for receiving input from users 102, such as selection of content to include or exclude from output 116, and so forth.

Other data 526 within the data store(s) 520 may include configurations, settings, preferences, and default values associated with computing devices 110. Other data 526 may also include encryption keys and schema, access credentials, and so forth. Other data 526 may additionally include audio files for output, such as during performance of activities by a user 102.

In different implementations, different computing devices 110 may have different capabilities or capacities. For example, servers may have greater processing capabilities or data storage capacity than smartphones or other portable computing devices 110.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
acquire a first authorization from an actor to acquire first video data;
acquire, using a first camera, the first video data representing the actor in one or more first poses;
determine the one or more first poses of the actor based on the first video data;
acquire a second authorization from a participant to acquire second video data representing the participant performing an activity;
present, using a first output device associated with the participant, output that depicts an instructor performing the activity;
acquire, using a second camera, the second video data;
determine pose data based on the second video data, wherein the pose data represents one or more second poses of the participant during performance of the activity;
generate third video data based on the first video data and the pose data, wherein the third video data represents the actor performing the activity by achieving the one or more second poses of the participant; and
send the third video data to a second output device associated with the instructor.

2. The system of claim 1, further comprising computer-executable instructions to:
train a conditional generative adversarial network (C-GAN) using at least a portion of the first video data;
process the second video data with a generative model of the C-GAN to generate the third video data; and
process the third video data using a discriminative model of the C-GAN to determine first data indicative of whether the third video data includes recorded content or artificially generated content, wherein the first data indicates that the third video data includes recorded content.

3. The system of claim 1, further comprising computer-executable instructions to:
receive input from the instructor requesting generation of fourth video data that represents the instructor performing the activity;
generate the fourth video data based on the pose data and further based on fifth video data that represents the instructor in one or more third poses; and
send the fourth video data to a third output device associated with one or more participants associated with the activity.

4. A method comprising:
receiving first authorization from a first user to use first video data representing the first user performing an activity;
acquiring the first video data using a first camera;
determining first pose data based on the first video data, wherein the first pose data represents one or more first poses of the first user performing the activity;
receiving second authorization from a second user to use appearance data that represents the second user in one or more second poses;
acquiring the appearance data using a second camera;
generating second video data based on the first pose data, the appearance data, and one or more constraints indicative of a location of at least one first body part of the second user relative to at least one second body part of the second user, wherein the second video data depicts the second user performing the activity associated with the first pose data;

sending at least a portion of the second video data to a first output device associated with one or more of the second user or a third user;

receiving, from an input device associated with the first output device, first input indicative of an error in performance of the activity; and providing data indicative of the first input to a second output device associated with the first user.

5. The method of claim 4, further comprising:

presenting, using the second output device, third video data that represents the second user performing the activity, wherein the second video data depicts the second user based on presentation of the third video data using the second output device.

6. The method of claim 4, further comprising:

acquiring third video data representing the second user performing the activity by achieving one or more third poses; and generating a user interface based on the second video data and the third video data, wherein the user interface presents:

the second user performing the activity by achieving the one or more first poses based on the second video data; and the second user performing the activity by achieving the one or more third poses based on the third video data.

7. The method of claim 4, further comprising:

receiving second input requesting generation of third video data associated with the one or more of the second user or the third user; and generating the third video data based on the first pose data and based on fourth video data that represents the one or more of the second user or the third user in one or more third poses.

8. The method of claim 4, further comprising:

training a conditional generative adversarial network (C-GAN) using the appearance data;

processing the first video data with a generative model of the C-GAN to generate the second video data; and processing the second video data using a discriminative model of the C-GAN to determine first data indicative of whether the second video data includes recorded content or artificially generated content, wherein the first data indicates that the second video data includes recorded content.

9. The method of claim 4, wherein the appearance data includes one or more of:

third video data that represents the second user in the one or more second poses;

image data that represents the second user in the one or more second poses; or second pose data that represents the one or more second poses of the second user.

10. The method of claim 4, further comprising:

determining, based on the appearance data, that the one or more second poses are within a threshold variance of the one or more first poses, wherein the second user is included in the second video data based on the one or more second poses being within the threshold variance of the one or more first poses.

11. The method of claim 4, wherein the appearance data includes third video data representing the second user performing the one or more second poses, the method further comprising:

receiving a third authorization from the second user to use the third video data to generate the second video data; and determining the one or more second poses based on the third video data, wherein the second video data is generated based in part on the one or more second poses.

12. The method of claim 4, further comprising:

determining a portion of the first video data that represents one or more of a background or a face of the first user; and excluding a representation of the portion of the first video data from the second video data.

13. A system comprising:

one or more memories storing computer-executable instructions; and one or more hardware processors to execute the computer-executable instructions to:

acquire a first authorization to use first video data representing a first user performing an activity;

acquire the first video data using a first camera;

determine pose data based on the first video data, wherein the pose data represents one or more first poses of the first user performing the activity;

acquire a second authorization to use appearance data representing a second user in one or more second poses;

acquire the appearance data using a second camera;

determine that the one or more first poses of the first user are within a first threshold variance of the one or more second poses of the second user; and generate, based on the pose data that represents the one or more first poses of the first user and the appearance data that represents the second user in the one or more second poses, second video data that represents the second user performing the activity associated with the pose data.

14. The system of claim 13, further comprising computer-executable instructions to:

present, using a first output device associated with the first user, third video data that represents the second user performing the activity using one or more third poses, wherein the second video data includes the second user based on presentation of the third video data using the first output device;

receive a third authorization to send the second video data to the second user; and send at least a portion of the second video data to a second output device associated with the second user.

15. The system of claim 13, further comprising computer-executable instructions to:

present, using an output device associated with the second user, third video data that represents the first user performing the activity using one or more third poses, wherein the second video data includes the second user based on presentation of the third video data using the output device.

16. The system of claim 13, further comprising computer-executable instructions to:

acquire third video data representing the second user performing the activity by achieving one or more third poses; and present, using an output device, at least a portion of the third video data associated with the one or more third poses concurrently with at least a portion of the second video data associated with the one or more first poses.

17. The system of claim 13, further comprising computer-executable instructions to:

send at least a portion of the second video data to a device associated with a third user; and generate third video data based on the pose data and further based on fourth video data that represents the third user in one or more third poses.

18. The system of claim 13, further comprising computer-executable instructions to:
   determine that the second user has a first dimension within a second threshold variance of a second dimension of the first user, wherein the second user is included in the second video data based on the first dimension being within the second threshold variance of the second dimension.

19. The system of claim 13, wherein each pose of the one or more first poses is represented by a plurality of points, and each point of the plurality of points represents a location of a respective body part of the first user.

20. The system of claim 13, further comprising computer-executable instructions to:
   determine a portion of the first video data that represents a first background; and
   exclude the first background from the second video data by one or more of obscuring the first background or replacing the first background with a second background.

21. A system comprising:
   one or more memories storing computer-executable instructions; and
   one or more hardware processors to execute the computer-executable instructions to:
      determine pose data based on first video data, wherein the pose data represents a first pose of a first user performing an activity;
      determine appearance data that represents one or more second poses of a second user; and
      generate, based on the pose data that represents the first pose of the first user and the appearance data that represents the second user in the one or more second poses, second video data that represents the second user performing the activity associated with the pose data.

22. A system comprising:
   one or more memories storing computer-executable instructions; and
   one or more hardware processors to execute the computer-executable instructions to:
   determine one or more first poses of a first user based on first video data that represents the first user performing an activity;
   determine appearance data that represents one or more second poses of a second user; and
   generate, based on the one or more first poses and the appearance data, second video data that represents the second user performing the activity associated with the first video data.

* * * * *